(12) United States Patent
Mosleh et al.

(10) Patent No.: US 7,774,293 B2
(45) Date of Patent: Aug. 10, 2010

(54) SYSTEM AND METHODS FOR ASSESSING RISK USING HYBRID CAUSAL LOGIC

(75) Inventors: Ali Mosleh, Columbia, MD (US); Chengdong Wang, Greenbelt, MD (US); Franciscus J. Groen, College Park, MD (US)

(73) Assignee: University of Maryland, College Park, MD (US)

( * ) Notice: Subject to any disclaimer, the term of this patent is extended or adjusted under 35 U.S.C. 154(b) by 339 days.

(21) Appl. No.: 11/377,313

(22) Filed: Mar. 17, 2006

(65) Prior Publication Data

US 2007/0011113 A1    Jan. 11, 2007

Related U.S. Application Data

(60) Provisional application No. 60/662,610, filed on Mar. 17, 2005.

(51) Int. Cl.
*G06F 17/00* (2006.01)
*G06N 7/00* (2006.01)
*G06N 7/08* (2006.01)

(52) U.S. Cl. .................................................. 706/53
(58) Field of Classification Search .................. 706/53
See application file for complete search history.

(56) References Cited

U.S. PATENT DOCUMENTS 6,820,044 B2 * 11/2004 Groen et al. .................. 703/2
7,158,958 B2 * 1/2007 Przytula et al. ............. 706/45
2005/0043922 A1 * 2/2005 Weidl et al. ................. 702/183

OTHER PUBLICATIONS

Darwiche, A. "A Logical Approach to Factoring Belief Networks". KR 2002: pp. 409-420.*
Mosleh, A., et al., preprint of "An Integrated Framework for Identification, Classification, and Assessment of Aviation Systems Hazards", Proc. PSAM 7, Berlin, 2004, pp. 2384-2389.
Andrews, J., et al., "Event-Tree Analysis Using Binary Decision Diagrams", IEEE Transactions on Relialability, vol. 49, No. 2, Jun. 200, pp. 230-238.
Shafer, G., et al., Jan. 1989 preprint of "Probability Propagation", Ann. Math. Artificial Intelligence 2, 1990, pp. 327-352.
Huang, C., et al., "Inference in Belief Networks: A Procedural Guide", International Journal of Approximate Reasoning, 1994, 11, pp. 1-45.
Jensen, F., "Implementation Aspects of Various Propagation Algorithms in Hugin", Technical Report R-94-2014, Aalborg University, Denmark, Mar. 1994.
Sinnamon, R., "Fault Tree Analysis and Binary Decision Diagrams", 1996 Proceedings Annual Reliability and Maintainability Symposium, IEEE 1996, pp. 215-222.

* cited by examiner

*Primary Examiner*—Donald Sparks
*Assistant Examiner*—Li-Wu Chang
(74) *Attorney, Agent, or Firm*—Rosenberg, Klein & Lee

(57) ABSTRACT

A hybrid causal framework applies properties of probabilistic models, such as Bayesian belief networks, to causal logic models, such as fault trees and event sequence diagrams. The probabilistic model establishes a joint probability distribution of causal relationships between events and conditions in the logic models. The probability of the events and conditions are found by propagating probabilities from the probabilistic model through the logic models.

19 Claims, 11 Drawing Sheets

US 7,774,293 B2

SYSTEM AND METHODS FOR ASSESSING RISK USING HYBRID CAUSAL LOGIC

RELATED APPLICATION DATA

This Application for Patent is based on a previously filed Provisional Application Ser. No. 60/662,610, filed on 17 Mar. 2005.

STATEMENT REGARDING FEDERALLY SPONSORED RESEARCH

The invention described herein was developed through research funded by the U.S. Government under contract number DTFACT03C00024 awarded by the United States Federal Aviation Administration. The U.S. Government has certain rights to the invention.

BACKGROUND OF THE INVENTION

1. Field of the Invention

The invention described herein is directed to methods and systems for processing an integrated collection of facts in a system of interconnected models so as to infer measures of risk under selected circumstances in a system so modeled. Specifically, the invention provides a hybrid model from causal models, such as is characterized by fault trees and event sequence diagrams, and probabilistic models, such as is characterized by Bayesian belief networks, and determines probabilities of events in the causal models from conditions set in the probabilistic model.

2. Description of the Prior Art

Hazard analysis is focal strategy for assessing safety in many industries, including chemical process, power generation, and aviation and other transportation systems. A variety of assessment methods are used in practice, including simple experiment-based checklists, system or process "walk-throughs", Failure Mode and Effects Analysis (FMECA), and, more recently, fault tree analysis. Typically, a list of unsafe acts, conditions, failures or abnormal states of various elements of a system or process is developed, and some degree of likelihood and severity is subjectively assigned to each item on the list. It is common to express the likelihood on relative quantitative scales (e.g., 1, 2, 3, . . . ) or qualitative scales (e.g., Frequent, Probable, Occasional, Remote, Improbable, Incredible). Similarly, the severity or consequence of a hazard is often measured in relative terms (e.g., Catastrophic, Hazardous, and Insignificant). The combination of severity and likelihood indicates the level of risk for each hazard, as compared with other hazards on the list. Hazards on the list may then be grouped based on a combined risk index (e.g., Unacceptable, Undesirable and Acceptable).

A more sophisticated method of hazard identification is through hierarchical functional/physical/organizational decomposition of the system and/or process elements. As recently proposed for aviation hazard classification, the hierarchy is based on five main categories: Production, Mechanical (Ground Systems and Aircraft), Operational, Environmental and Regulatory. Further subcategories are defined for each of the main categories. The category Aircraft, for example, is divided into 35 categories of hazard sources. These include, at the same level in the hierarchy, Electric Power, Hydraulic Power, Oil, Air Conditioning, Water/Waste, Fuselage, Fuel Systems, Lights, Navigation, Engine, Landing Gear, and Doors. Below this level in the hierarchy are, of course, other levels of hazard sources.

Such hierarchical decompositions, while meaningful as a way of organizing and presenting the list of potential hazards, are of limited value in the identification of hazard and are virtually useless in assessing their safety significance. Obviously, the level in the hierarchy (proximity to the top) cannot be taken as an indication of their associated degree of importance. In other words, an important dimension of the problem, which is the complexity of the system and relation between causes is essentially absent from such "flat" models. Natural question arise, such as why any given item in the hierarchy is listed as a hazard; what are the single, multiple or common causes of the identified hazards and, if and how are they interrelated; and, at what level does one stop from further detailing the hierarchy?

While modifications to the above approach have been postulated, significant limitations remain in the determination of the role of possible hazard prevention or mitigation methods. For example, an event or condition may be a hazard in one context and under a specific set of circumstances, but not be a hazard in another context. This is certainly not reflected in the hazard identification and classification procedure described above. An even more significant limitation is the fact that the interrelationships among causal factors in a system as complex as an aviation system are often complicated, nonlinear and non-modular. Root causes may form the source of deep and overarching dependencies, while conditions or states of the system play the role of convergence points linking multiple causal pathways to multiple system impacts and consequences. The significance of context within which events and conditions could be viewed as a hazard has called into question the adequacy of the simple hierarchical approach to hazard identification. Additionally, it has become apparent that a more comprehensive set of analysis tools could be provided by a hybrid model framework that combines assets of multiple hazard assessment methodologies.

SUMMARY OF THE INVENTION

In one aspect of the invention, a method is provided for determining via a computing processor a probability associated with a causal scenario including an initiating event, at least one pivotal event and an end state. The causal scenario is modeled by a first causal model characterized by a plurality of first nodes interconnected one with another to define a termination of the causal scenario in the end state via Boolean states of a variable at each of said first nodes. Factors affecting the Boolean state of at least one variable at a corresponding one of the first nodes are modeled by a second causal model characterized by a plurality of second nodes. Each of the second nodes represents a corresponding multistate variable indicative of an attribute of the influencing factors and the second nodes are interconnected one with another in accordance with a joint probability distribution of the multistate variables. The second causal model includes at least one node corresponding to the at least one variable. A computational model is constructed from the first causal model and the second causal model and is executed on the processor to determine a probability of an event of the causal scenario in accordance with the joint probability distribution of the multistate variables.

In another aspect of the invention, a method is provided for analyzing risk associated with a causal scenario. First graphical elements are manipulated via a user interface to model the causal scenario by a first causal model. The first causal model is operable to determine an occurrence or nonoccurrence of an event in the causal scenario in accordance with states of a plurality of first variables respectively associated with the first graphical elements. Second graphical elements are manipulated via the user interface to model factors associated with the event by a second causal model, said second causal model operable to compute a probability of states of a plurality of second variables in accordance with a joint probability distribution of the plurality of second variables. Each of the second variables are respectively associated with the second graphical elements. The first causal model and the second causal model have at least one variable common therebetween. A probability of a state of the at least one common variable is computed on a computational processor in accordance with the joint probability distribution and a probability of the event is computed on the computational processor in accordance with the probability of the state of the at least one common variable.

In yet another aspect of the invention, an apparatus is provided for evaluating risk in a system, which includes sequential logic characterizing anticipated risk scenarios of the system. The sequential logic includes a plurality of decision units each corresponding to a pivotal event in the risk scenario. Each of the decision units is operable into an occurrence state or a nonoccurrence state of the pivotal event in accordance with a corresponding condition provided thereto. The apparatus also includes fault logic coupled to the sequential logic for providing the condition to each of the decision units. The fault logic includes a plurality of combinatorial elements for determining each condition from a corresponding set of causal factors. Also included in the apparatus is a probabilistic network coupled to the fault logic for characterizing uncertain relationships between the causal factors of the system. The probabilistic network includes a plurality of nodes interconnected one with another to define a joint probability distribution between variables representing the causal factors. The apparatus includes also a hybrid causal model operable to determine a probability of the risk scenarios from a probability of each pivotal event of the sequential logic as determined from a probability of each corresponding condition provided thereto by the fault logic as determined from the joint probability distribution between variables representing the corresponding causal factors of the probabilistic network.

DETAILED DESCRIPTION OF PREFERRED EMBODIMENTS

In accordance with the present invention, large-scale probabilistic risk assessment models are enhanced by the selective introduction of probabilistic models, such as Bayesian belief networks (BBNs). BBNs are used to model causal relationships such as the impact of organizational factors. For example, a BBN could model factors that include personnel training and maintenance procedures. These factors can then be weighed in terms of risk with causal factors characterized in traditional risk assessment models, such as fault trees (FTs) and event sequence diagrams (ESDs).

The connections between the BBNs and logic models are defined by binary variables in the BBN that correspond to basic events in the FTs, or directly as pivotal events in the ESDs. The probability of those events are then determined by the BBN and propagated through each logic model. The framework of the present invention includes factors that have widespread influences, such as the previously mentioned training or quality of maintenance, and as such, BBNs may affect multiple basic events across multiple fault trees.

Figure 1:
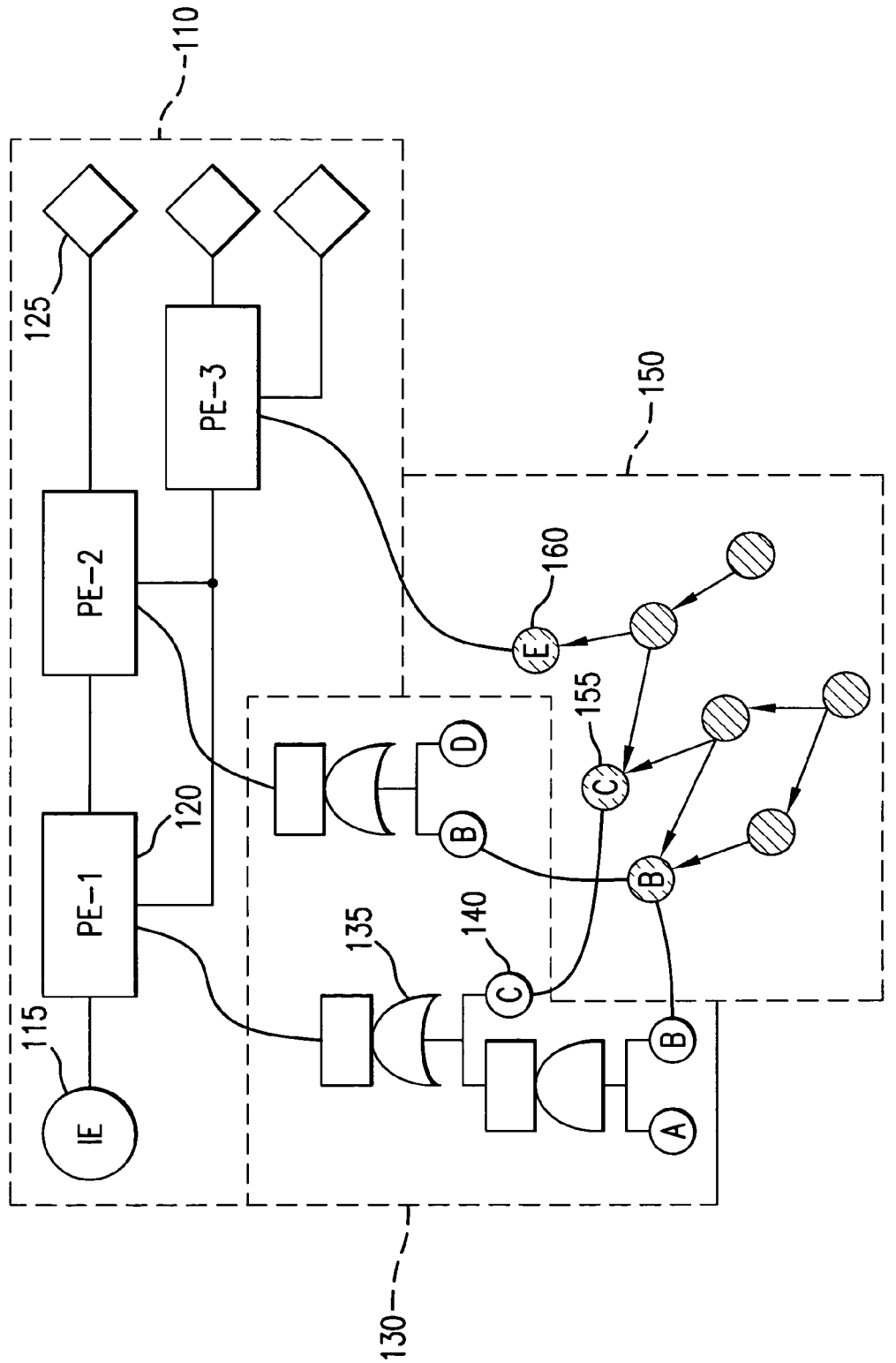
FIG. 1 is a schematic diagram of an exemplary hybrid causal model implemented in accordance with the present invention.

An example of possible connections between the various modeling elements is illustrated in FIG. 1. As is shown in the Figure, the hybrid logic includes sequence logic, as represented by an ESD 110, combinatorial logic, as represented by a fault tree FT 130, and a probabilistic network, as represented by a BBN 150. As is known in the art, ESD 110 captures various risk scenarios precipitating from an initiating event 115 through one or more pivotal events 120 to a terminal event 125, also referred to as an end state 125. The pivotal events may be captured by a decision unit operable into an occurrence state or a nonoccurrence state as determined by a condition provided thereto by either the FT 130 or the BBN 150.

The FT 130, as is known in the art, includes a plurality of combinatorial logic gates 135 for determining a condition from one or more Boolean variables represented by a Boolean variable node 140. One or more of the same variables are represented in the BBN 150, as shown by node 155 and node 140. The BBN 150 may also contain a variable node 160 that corresponds directly to a condition, which may be provided to a pivotal event decision unit in the ESD 110.

Hybrid causal models of the present invention provide the enhanced modeling power attributed to BBN-based modeling methods. The use of BBNs in hybrid causal model is primarily intended for to represent causal relationships and their impact on the probabilities and frequencies of events represented in the Fault Tree and Event Sequence Diagram models. Additionally, however, the BBNs beneficially allow the implementation of multistate logic by representing each state as a separate basic event in a fault tree model. By associating the events with different states of a single multistate variable in the BBN, the basic events become mutually exclusive.

The present invention propagates probabilities through causal representations of differing topologies, such as those of fault trees, event sequence diagrams and BBNs. This may be accomplished by transforming causal mappings of fault trees and event sequence diagram models into reduced order binary decision diagram (BDD) models using BDD construction algorithms extensively known in the art. BDDs are both reduced, meaning that every subtree is unique, and ordered, meaning that the order of BDD variables along every path from root node to terminal is identical. It has been shown that BDD-based algorithms efficiently quantify large fault tree models. Thus, the present invention beneficially generalizes a BDD-based quantification procedure, rather than attempting to quantify FT and ESD models by converting them first into a BBN format.

Figure 2:
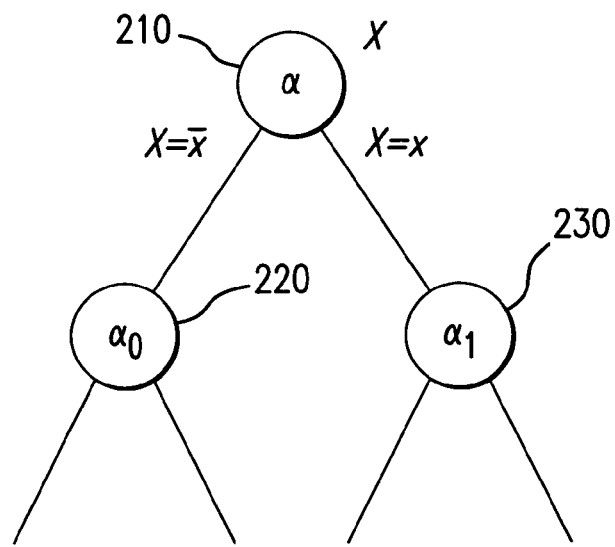
FIG. 2 is a diagram illustrating a decision node of a binary decision diagram.

A BDD consists of a graphical tree structure, such as that illustrated in FIG. 2, in which each node $\alpha=\Delta(X, \alpha_1, \alpha_0)$, illustrated at 210, represents the Boolean expression "If (X=x) then $\alpha_1$ else $\alpha_0$". Here, X is a Boolean variable, which will be referred to herein as a BDD variable. In terms of typical fault tree analysis, each variable corresponds to a fault tree basic event. The values of X are denoted as x (true) or $\bar{x}$ (false), respectively. The nodes $\alpha_0$ and $\alpha_1$, illustrated at 220 and 230, respectively, represent Boolean expressions, and consist of either a BDD decision node as defined above or a 0 (false) or 1 (true) terminal node.

The transformation from FT and ESD to BDD may be accomplished by procedures well known in the art. In certain embodiments of the invention, a function APPLY($\alpha$, $\beta$, op) defines a recursive procedure for BDD nodes $\alpha$ and $\beta$ and logical operation op. Such operations include AND, OR, XOR, NOR, and NAND. For cases where no trivial solution exists, i.e., where neither $\alpha$ nor $\beta$ is a terminal node, the rules are applied in accordance with Table 1 below.

TABLE 1

| Input Condition $\alpha$, $\beta$ | APPLY($\alpha$, $\beta$, op) |
|---|---|
| $X_\alpha > X_\beta$ | $\Delta(X_\alpha, \text{APPLY}(\alpha|\bar{x}_\alpha, \beta, op), \text{APPLY}(\alpha|x_\alpha, \beta, op))$ |
| $X_\alpha < X_\beta$ | $\Delta(X_\beta, \text{APPLY}(\alpha, \beta|\bar{x}_\beta, op), \text{APPLY}(\alpha, \beta|x_\beta, op))$ |
| $X_\alpha = X_\beta = X$ | $\Delta(X, \text{APPLY}(\alpha|\bar{x}, \beta|\bar{x}, op), \text{APPLY}(\alpha|x, \beta|x, op))$ |

In Table 1, $X_\alpha > X_\beta$ and $X_\alpha < X_\beta$ refer to an ordering of variables in the model, which must be established in advance using an appropriate heuristic. A simple heuristic adds variables to the order as they are encountered when traversing the fault tree. Furthermore, it is to be noted that $\alpha|x_\alpha = \alpha_1$ and $\alpha|\bar{x}_\alpha = \alpha_0$.

Figure 3:
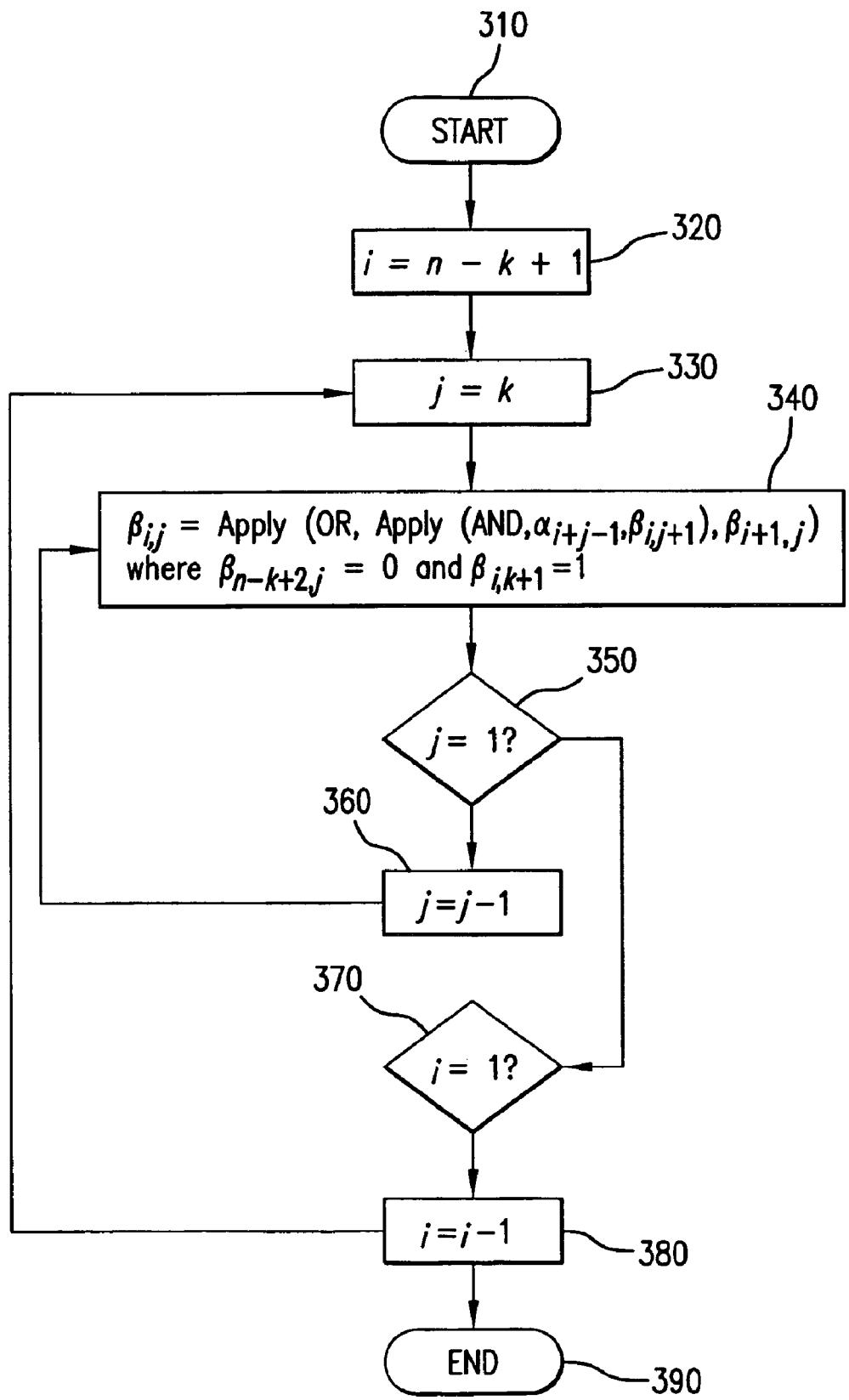
FIG. 3 is a flow diagram illustrating steps for constructing a binary decision diagram from k-out-of-n gates of a fault tree.

A BDD corresponding to a fault tree is constructed by successively applying the APPLY operation so as to construct the BDDs corresponding to all fault tree gates and/or pivotal events in the ESDs, starting at the lowest level. Each basic event is represented by a corresponding BDD node $\Delta(X,0,1)$. BDDs corresponding to k-out-of-n gates are, in certain embodiments, constructed in accordance with the procedure illustrated in FIG. 3, where the construction procedure is entered at block 310. Process flow is then transferred to block 320, where an index variable i is initialized. Flow is then transferred to block 330, where an index variable j is initialized. The indices i and j are initialized so that the lowest gate of the diagram is addressed first. Then, the process proceeds to block 340, where the APPLY operation is applied to determine $\beta_{i,j}$. Then, the process proceeds to blocks 350-380, where the variables j and i, respectively, are decremented and the process is looped until all $\beta_{i,j}$ have been processed. The procedure is exited at block 390.

Given a risk scenario represented by an occurrence of an initiating event, a sequence of occurrences and nonoccurrences of pivotal events, and an end state, where fault trees are used to specify the conditions under which the pivotal event does or does not take place, a BDD representation of the scenario logic is combined with the BDD obtained for the fault trees at associated pivotal events in accordance with the logic of the sequence.

A BBN is defined as a directed acyclic graph that encodes the independence properties of a joint probability density. As is known in the art, nodes in the graph correspond to uncertain variables and edges between nodes represent direct probabilistic influences between the variables. The absence of edges represents the perceived absence of such direct influences.

A hybrid BBD/BNN structure consistent with the present invention is then defined as a BDD structure in which one or more BDD variables are represented as a variable in a BBN. Consequently, the probability distribution for those variables is defined by the BBN.

Figure 4A:
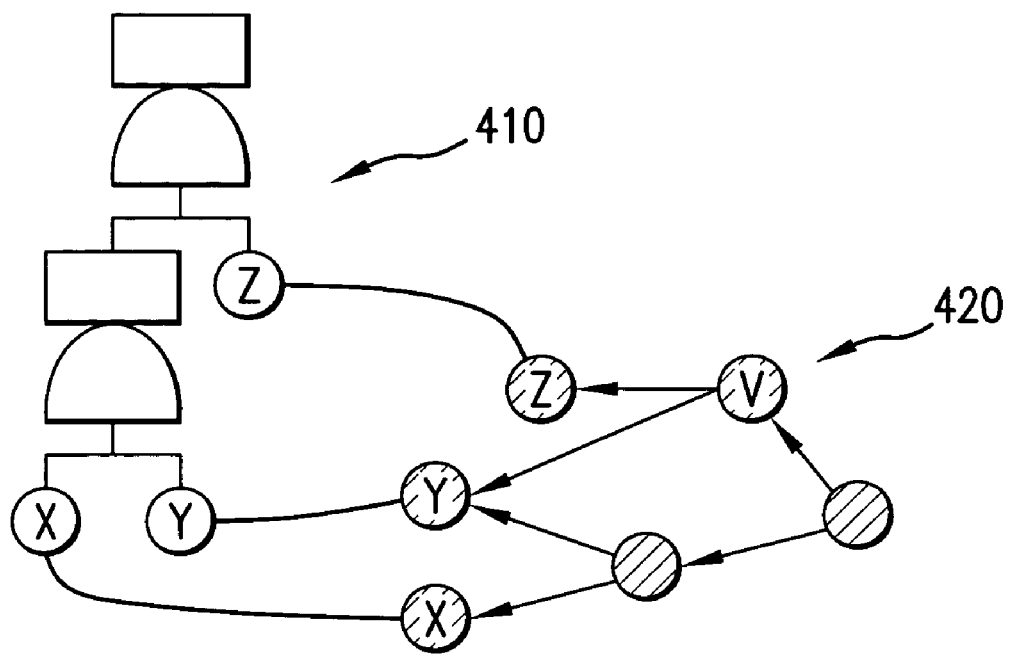
FIGS. 4A-4B are schematic diagrams of hybrid fault tree/Bayesian belief network unit and a corresponding equivalent binary decision diagram/Bayesian belief network structure, respectively, according to aspects of the present invention.
Figure 4B:
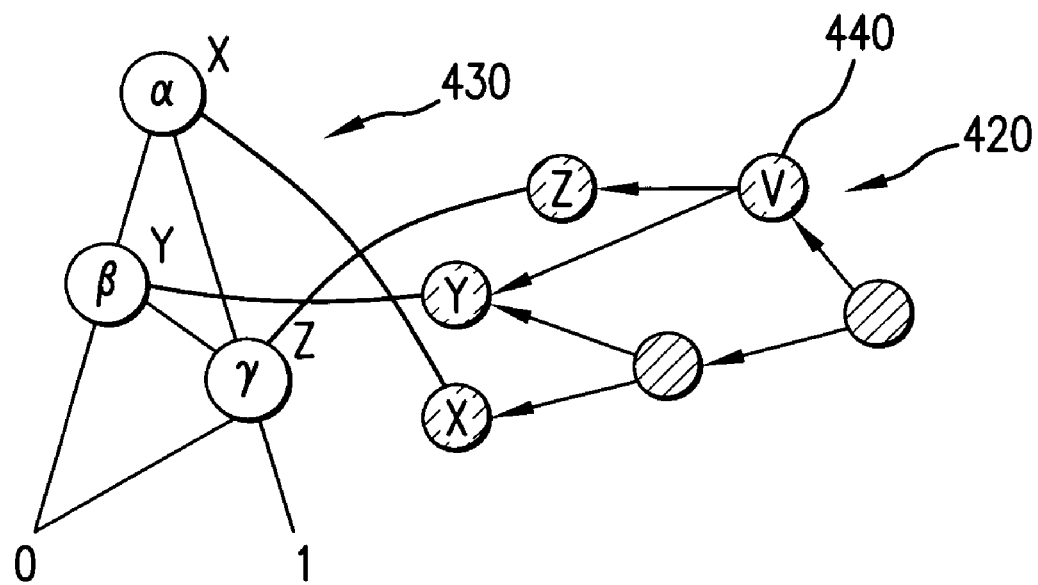

FIG. 4B illustrates an exemplary hybrid structure, showing a BDD 430 representing the Boolean expression (xz+yz) and a BBN 420 representing the joint density $\pi$(x,y,z, ... ). The corresponding fault tree 410 and BBN 420 model are shown in FIG. 4A. In this example, all BDD variables are dependent on the BBN. In typical applications, only a fraction of the variables is expected to be dependent.

In order to compute the probability of an event or scenario in accordance with the present invention, the corresponding hybrid BDD/BNN is quantified. The probability of a non-hybrid BDD node $\alpha$ may be computed using the recursive rule, $$Pr(\alpha) = Pr(x) \cdot Pr(\alpha_1) + (1 - Pr(x)) \cdot Pr(\alpha_0). \qquad (1)$$

This rule computes the probability of a BDD node as a function of the probability of the BDD variable associated with the node, as well as the probabilities of the underlying nodes.

Once the BDD corresponding to a Boolean expression is available, the quantification of the BDD using this rule is highly efficient. By storing the probability Pr($\alpha$) of each node $\alpha$ once it is computed, subsequent quantifications of the same node, which occur when a BDD node has multiple parent nodes, then only require a lookup of the previously computed value. It is therefore sufficient to compute each node's probability in the BDD only once.

Equation 1 cannot be directly applied to hybrid BDD/BBN structures, since it requires that the variables in the BDD be independent. In case of hybrid BDD structures, the independence of variables may however be lost, as is illustrated in FIG. 4B. Whenever variable V, as represented by node 440, is not instantiated, i.e., has not been assigned a value, variables Y and Z are dependent, which can be verified using, for instance, a Bayes Ball test.

The quantification of hybrid structures would be possible by applying the summation rule. Let M be a set of variables whose instantiation causes all variables in the BDD to become conditionally independent. Here, the instantiation of a set of variables is the assignment of a value to each of the variables in the set. If $L_M$ is the set of all instantiations of M, then $$Pr(\alpha) = \sum_{L \in L_M} Pr(\alpha \mid L) \cdot Pr(L), \qquad (2)$$

where Pr($\alpha$|L) can be computed using Equation 1. Equation 2 represents, however, a brute force method, whose application quickly becomes infeasible due to an explosion of the number of terms in the summation.

The present invention provides a more efficient procedure for quantification of hybrid BDD/BNN structures by generalizing the recursive formula of Equation 1. A function $f$ computes the probability $\alpha$ conditioned on L by $$f(\alpha,L)=Pr(\alpha|L). \quad (3)$$

The function $f$ may be written in the form of a recursive equation $$f(\alpha,L)=Pr(x|L)\cdot f(\alpha_1,L\cdot x)+(1-Pr(x|L))\cdot f(\alpha_0,L\cdot \overline{x}) \quad (4)$$

corresponding to the probabilistic decomposition $$Pr(\alpha|L)=Pr(x|L)\cdot Pr(\alpha_1|L\cdot x)+Pr(\overline{x}-|L)\cdot Pr(\alpha_0|L\cdot \overline{x}). \quad (5)$$

Here, $L\cdot x$ denotes the logical conjunction of L and x. In the case where $\alpha$ equals 1 (true), $f$ returns 1. When a equals 0 (false), $f$ returns 0.

To illustrate this rule, it is applied to the simple hybrid causal model shown in FIG. 4A, which consists of the fault tree xz+yz. Basic events X, Y and Z are all dependent on causal factors represented by the BBN, as is shown in by the corresponding hybrid BDD/BBN structure of FIG. 4B.

Quantification of the structure illustrated in FIG. 4B proceeds with the following steps:

$$Pr(\alpha)=Pr(\overline{x})\cdot Pr(\beta|\overline{x})+Pr(x)\cdot Pr(\gamma|x);$$

$$f(\beta,\overline{x})=Pr(\beta|\overline{x})=Pr(\gamma|\overline{x})\cdot 0+Pr(y|\overline{x})\cdot Pr(\gamma|y\overline{x});$$

$$f(\gamma,y\overline{x})=Pr(\gamma|y\overline{x})=Pr(\overline{z}|y\overline{x})\cdot 0+Pr(z|y\overline{x})\cdot 1;\text{ and}$$

$$f(\gamma,x)=Pr(\gamma|x)=Pr(\overline{z}|x)\cdot 0+Pr(z|x)\cdot 1.$$

By making the appropriate substitutions, it is found that the procedure decomposes $Pr(\alpha)$ into $$Pr(\alpha)=Pr(\overline{x})\cdot Pr(y|\overline{x})\cdot Pr(z|y\overline{x})+Pr(x)\cdot Pr(z|x).$$

This equation can be reduced to the expected result $$Pr(\alpha) = Pr(\overline{x}yz) + Pr(xz)$$
$$= Pr(yz + xz)$$

even though variables X, Y and Z are dependent.

The foregoing example illustrates a beneficial feature of the invention, i.e., $f(\alpha,L)$ is applied once at each node with the appropriate conditions L. The conditional marginal probabilities $Pr(\overline{x})$, $Pr(y|\overline{x})$, $Pr(z|y\overline{x})$, $Pr(x)$ and $Pr(z|x)$ follow from the BBN.

Figure 5:
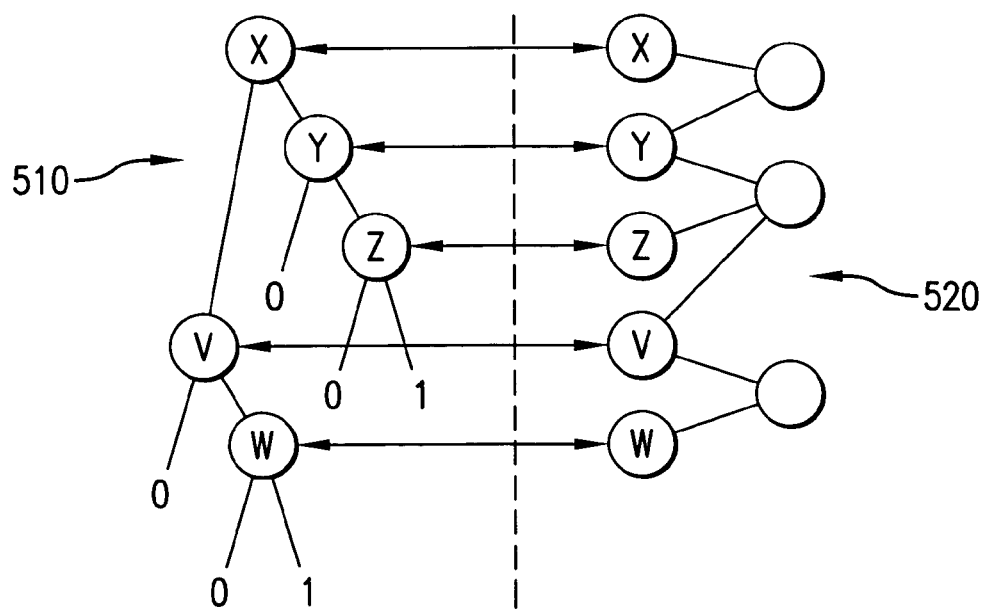
FIG. 5 is an exemplary binary decision diagram/Bayesian belief network hybrid in accordance with the present invention.

Compared to Equation 2, Equation 4 leads to a reduction in the required number of computations. An extreme example of this reduction is shown in FIG. 5, in which a hybrid structure is shown consisting of a BDD 510 with variable X, Y, Z, V and W. All five variables are part of a BBN 520. The quantification of the hybrid structure using Equation 4 requires one visit of each of the five BDD nodes, whereas using Equation 2 would require the BDD to be quantified between $2^3=8$ and $2^5=32$ times, depending on the choice of M.

More typically, a significant fraction of the BDD nodes has multiple parent nodes, which requires that those nodes are quantified more than once, and possibly for different conditions L. For instance, node $\gamma$ in FIG. 4B is quantified twice for two different conditions leading to that node.

When implementing Equation 3 as a computational procedure, additional efficiencies can be achieved by introducing special cases of Equation 4. First, if the variable X associated with a BDD node a is independent, $f$ can be computed more efficiently by $$f(\alpha,L)=Pr(x)\cdot f(\alpha_1,L)+(1-Pr(x))\cdot f(\alpha_0,L) \quad (6)$$

taking advantage of the fact that X does not depend on any other variable $$Pr(x|L)=Pr(x) \quad (7)$$

nor does any other variable depend on X $$Pr(y|L\cdot x)=Pr(y|L\cdot \overline{x})=Pr(y|L). \quad (8)$$

In certain embodiments of the invention, the application of Equation 4 restricts L to include only the conditions necessary for computing the probability of $\alpha$. Computational efficiency is enhanced when $f(\alpha,L)$ can return a previously computed probability value. This is possible where the evaluation of $f(\alpha,L)$ was at some point preceded by an evaluation of $f(\alpha,K)$ and it can be determined without computing the actual probability that $Pr(\alpha|K)=Pr(\alpha|L)$. Consequently, in certain embodiments of the invention, a table of previously computed probability values is created using $\alpha$ and L as indices into the table. For cases other than $\alpha=0$ and $\alpha=1$, each evaluation of function $f$ first checks the table of computed values. This can lead to a significant reduction of the number of times the probability of a given BDD node needs to be computed.

The condition $Pr(\alpha|K)=Pr(\alpha|L)$ does not require L=K. An important example is the case where a BDD $\alpha$ is a standard, non-hybrid BDD. In that case, it follows directly that for all possible instantiations L of the dependent variables $$Pr(\alpha|L)=Pr(\alpha). \quad (9)$$

The probability of non-hybrid BDD nodes needs to be computed only once. The unconditional probability for these nodes can be stored and retrieved using the condition $L=\emptyset$. Whether or not a BDD node is a hybrid node can be checked prior to actual quantification.

In cases where the BBN consists of a single, connected graph, other conditions for which $Pr(\alpha|K)=Pr(\alpha|L)$ seem unlikely, or at least hard to detect. Ignoring specific configurations of the BBN, all non-instantiated dependent variables will normally be dependent on all such variables. The present invention provides additional reductions in the case of multiple BBN graphs, which are described separately below.

The computational procedure implementing $f(\alpha,L)$ as described above can be summarized using six conditions and corresponding results. In certain embodiments of the procedure, such as that illustrated in FIG. 6, the conditions are evaluated in the specified order until one of the conditions is satisfied. The procedure is entered at block 605, and flow is transferred to decision block 610, where it is determined if $\alpha=0$. If so, flow is transferred to block 615, where the return value for $f(\alpha,L)$ is set to 0. If condition 610 is not met flow is transferred to decision block 620, where it is determined if $\alpha=1$. If the condition is met, the return value for $f(\alpha,L)$ is set to 1, as shown at block 625. Otherwise, flow is transferred to block 630, where it is determined if $\alpha$ is a non-hybrid node, i.e., one that is not a member node of the BBN. If so, flow is transferred to block 635, where the return value for $f(\alpha,L)$ is set to $f(\alpha,\emptyset)$. If the condition 630 is not met, flow is transferred to decision block 640, where it is determined if $(\alpha,L)$ already exists in a table. If it has, then the return value $f(\alpha,L)$ is set to the previously computed value $Pr(\alpha|L)$, as shown at block 645. If $(\alpha,L)$ is not in the computed table, flow is transferred to block 650, where it is determined if the variable X is independent. If so, flow is transferred to block 655, where $f(\alpha,L)$ is computed on X without regard to L. Otherwise, flow is transferred to block 665, where $f(\alpha, L)$ is computed on X as conditioned on L. In certain embodiments of the invention, the computed results corresponding to both decisions made at block 650 are added to the computed table.

Figure 6:
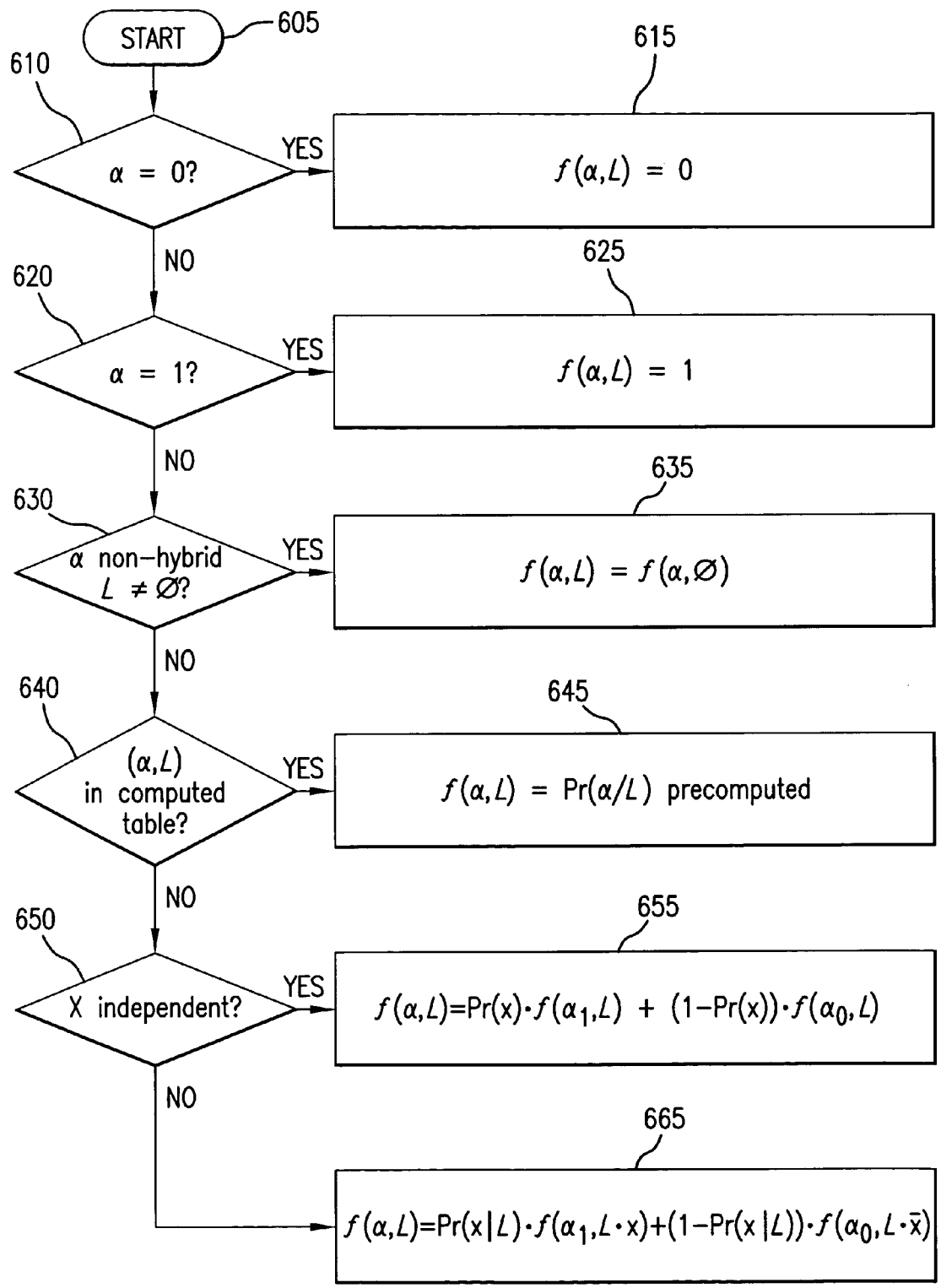
FIG. 6 is a flow diagram illustrating an exemplary quantification procedure of a hybrid binary decision diagram/Bayesian belief network according to the present invention.

The procedure of FIG. 6 does not pose any specific constraints on the variable order in the BDD. Still, it is believed that from a computational standpoint, it is generally advantageous to place dependent variables together in the variable order, as it minimizes the number of BDD nodes that need to be quantified for multiple conditions L. It is to be further noted that the procedure of FIG. 6 is not limited to the quantification of hybrid causal models, and can generally be applied to problems in which the events in the Boolean logic models (variables in the BDD) are dependent, as long as the conditional marginal probabilities of the dependent variables can be found.

An additional ordering applies where the BDD variables are spread over multiple smaller BBN graphs, rather than being connected by a single, large BBN graph. In this case, only the variables within each graph depend on each other. Certain embodiments of the present invention group such variables in the variable ordering so as to result in a faster quantification procedure.

For example, consider a BDD with variables X, Y, V and W. Let variables X and Y be connected by one BBN graph and variables V and W be connected by another. If the variable ordering X, Y, V, W is applied, it can be observed that any BDD node with variable V or W is not dependent on variables X or Y. When quantifying these nodes, X and Y can this be removed from condition L $$Pr(\alpha_{V,W}|L) = Pr(\alpha_{V,W}|L\backslash\{X,Y\}),\qquad(10)$$

where the operator "\" refers to a filtering operation removing $\{X, Y\}$ from L. Limiting L to include only those conditions necessary to determine the probability increases the chance that a previously computed probability value can be used, resulting in faster computations. The reduction would however not be possible in case of a variable order such as X, V, W, Y.

Once the BDD variable order is established, the filtering of conditions L applied to a node follow from the variable referred to by that node. Thus, a determination of a variable's dependency must be made for each position in the variable order with respect to the set of variables higher in the order. Since variables are guaranteed to be encountered in the BDD variable order, the list of variables associated with a BDD node $\alpha$ are readily available as those occurring later in the order. If none of the variables is dependent on a condition in L, L is filtered by removing the condition prior to computing $f(\alpha|L)$. The filtering operation replaces condition 630 in the procedure of FIG. 6.

In certain embodiments of the invention, stronger filtering is implemented to provide additional speed optimizations. Filter sets for individual BDD nodes are determined in advance and stored for each node rather than for each BDD variable. This filtering does, however, increase the memory requirements for implementing the invention so embodied.

The quantification procedures described above require the repeated quantification of dependent variables in the BBNs. The quantification of these variables corresponds to the propagation of evidence in a BBN in order to compute marginal probability distributions, which is a standard operation in BBN theory. The following procedure is based on well known quantification procedures of dependent variables by first converting the BBN into a secondary structure, namely a junction tree. Junction trees are unidirected graphs whose nodes represent sets of variables called cliques. Each link between the nodes is labeled with a separator, which consists of the intersection of the adjacent cliques. A junction tree furthermore has the property that for each pair of cliques in the graph, all cliques on the path between two cliques contain the intersection of the two cliques (junction tree property). Each clique and separator in the tree contains a table of all possible configurations of the corresponding variable sets.

The objective of the conversion procedure is to arrive at a junction tree graph in which for each variable X, there exists a clique containing X and all parents of X, and from which the joint probability density is found by taking the product of all clique tables divided by all separator tables.

Figure 7:
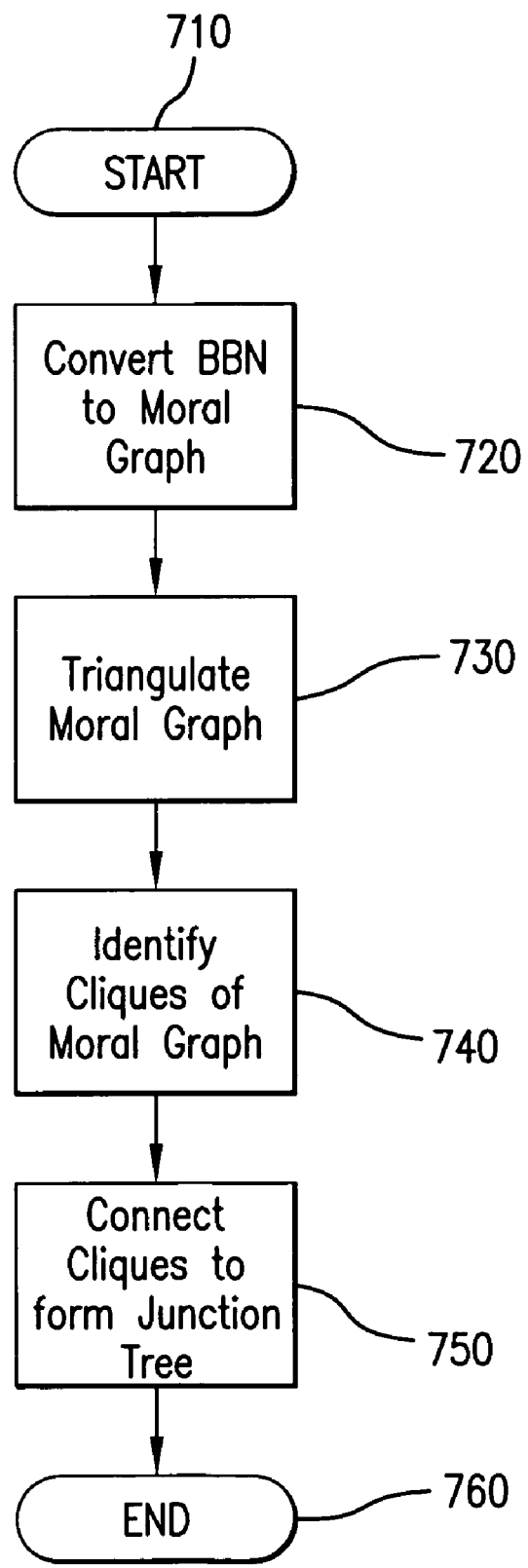
FIG. 7 is a flow diagram illustrating fundamental steps for converting a Bayesian belief network to a corresponding junction tree representation thereof.

Referring now to FIG. 7, there is shown a flow diagram of fundamental method steps for converting a BBN to a junction tree. During this process, the BBN is converted to a junction tree graph structure that encodes the joint probability distribution also represented by the BBN. This conversion is performed once at the start of the quantification of the hybrid BDD/BBN model.

As is shown in FIG. 7, the process is entered at block 710. Process flow is transferred to block 720, wherein the BBN is converted into a corresponding moral graph, which is a unidirected graph in which each variable X and its parents are linked pairwise. The moral graph $G_M$ corresponding to BBN G is constructed by copying G, discarding the directions of the links and then ensuring, for all variables in G, that links exist between each pair of parents of the variables, adding new links when necessary.

Once the moral graph has been constructed, flow is transferred to block 730, where the moral graph $G_M$ is triangulated. This is accomplished by adding links to the graph until all cycles consisting of more than three links contains a link between two nonadjacent nodes in the cycle. Specifically, a triangulated graph can be constructed by creating a copy $G_T$ of $G_M$. While nodes are left in $G_T$, select a node in $G_T$ and connect all nodes in the cluster formed by the selected node and its neighbors, by adding links to $G_T$ and creating corresponding links in $G_M$. The selected node is then removed from $G_T$.

Process flow is transferred to block 740, where the cliques of the moral graph $G_M$ are identified. These are the subgraphs that are both complete, meaning that each pair of nodes is connected by a link, and maximal, meaning that the clique is not part of a larger subgraph. Cliques may be identified during the triangulation of $G_M$ by saving each cluster that is not also included in a previously saved cluster.

Once the cliques have been identified, flow is transferred to block 750, where the junction tree is formed. This is achieved by connecting the identified cliques such that the resulting tree satisfies the junction tree property. Taking a set of trees each of a single clique, candidate separators are created for each pair of cliques in $G_M$. One candidate separator is selected and removed from the pool of candidate separators. If the cliques corresponding to the candidate separator belong to different trees, the trees are connected by inserting the separator between the cliques. This is repeated until a single tree remains. The process is exited at block 760.

The order in which the candidate separators are selected must be such that the separators with the largest number of variables in the intersection are selected first. If two or more candidate separators have the same number of variables, the separator is selected that connects cliques for which the sum of the number of configurations is the smallest.

Once the junction trees have been built, the computation of conditional probabilities may proceed. The conditional probability Pr(x|L,C) for a variable X is determined conditional on the state C of the causal factors in the model, as well as conditions L imposed by the recursive quantification rule for BDDs containing dependent variables. This requires a marginalization of the joint probability density represented by the BBN, but conditioned on the collective evidence L and C.

It is to be assumed that all evidence is hard, meaning that the evidence causes the values of some variables in the BBN to be known exactly, whereas the value of all other variables remains completely unknown.

Figure 8:
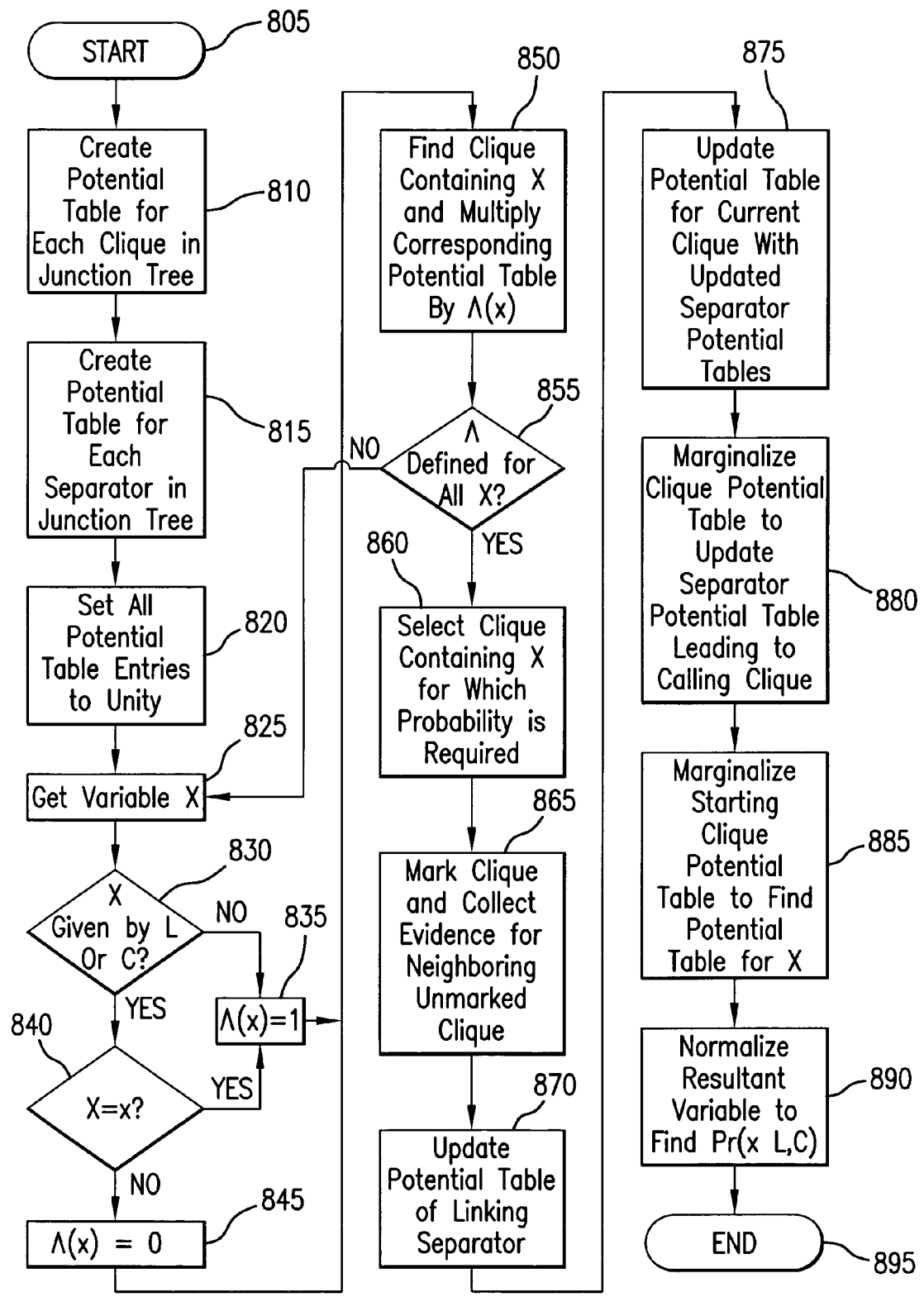
FIG. 8 is a flow diagram illustrating fundamental steps for computing conditional probabilities for a junction tree representation of a Bayesian belief network.

Referring now to FIG. 8, there is shown a flow diagram illustrating the fundamental steps of computing the conditional probability. Upon entry at block 805, the process flows to block 810, where, for each clique in the junction tree $G_J$, a table is created with an entry corresponding to each configuration of the clique variables. Similarly, for each separator, a table is created for each separator in the junction tree, as shown a block 815. These tables are referred to as potential tables. Flow proceeds to block 820, where each entry in the all of the potential tables is set to one (1).

When the potential tables have been created, a likelihood $\Lambda$ is defined for each variable X. Flow is transferred to block 825, where a variable X is obtained. Flow is then transferred to block 830, where it is determined if the variable X is given by L or C. If it is, flow is transferred to block 840, where it is determined if the variable X is x. If so, flow proceeds to block 835, where the likelihood $\Lambda(x)$ is set to one. If it is determined at block 849 that X≠x, then the logic proceeds to block 845, where the likelihood $\Lambda(x)$ is set to zero.

When, as determined at block 830 that X is not given by L or C, the likelihood $\Lambda(x)$ is set to unity, as shown at block 835. Overall flow is then transferred to block 850, where a clique containing X is located and the corresponding potential table is multiplied by the likelihood $\Lambda(x)$. It is then determined, at block 855, if $\Lambda$ has been defined for all X. If not, the process flow is transferred to block 825, where the next variable X is selected for processing.

If all X have been processed, as determined at block 855, flow proceeds to block 860, where a clique is selected that contains the variable X for which the probability is required. The evidence for the clique is then collected by first, as shown at block 865, marking the clique and collecting the evidence of any neighboring unmarked clique. Each such neighboring clique updates the potential table associated with the separator linking the cliques, as shown at block 870. The logic flows to block 875, where the potential table for the current clique is updated by multiplying it by the updated separator potential tables. Flow is then transferred to block 880, where the clique potential tables are marginalized in order to update the potential table for the calling clique.

Once the collecting of evidence has been completed, flow proceeds to block 885, where the potential table for the starting clique is marginalized to find the potential table for the required variable X. The resulting is then marginalized, as shown at block 890, to find the probability Pr(x|L,C). The process concludes at block 895.

Figure 9:
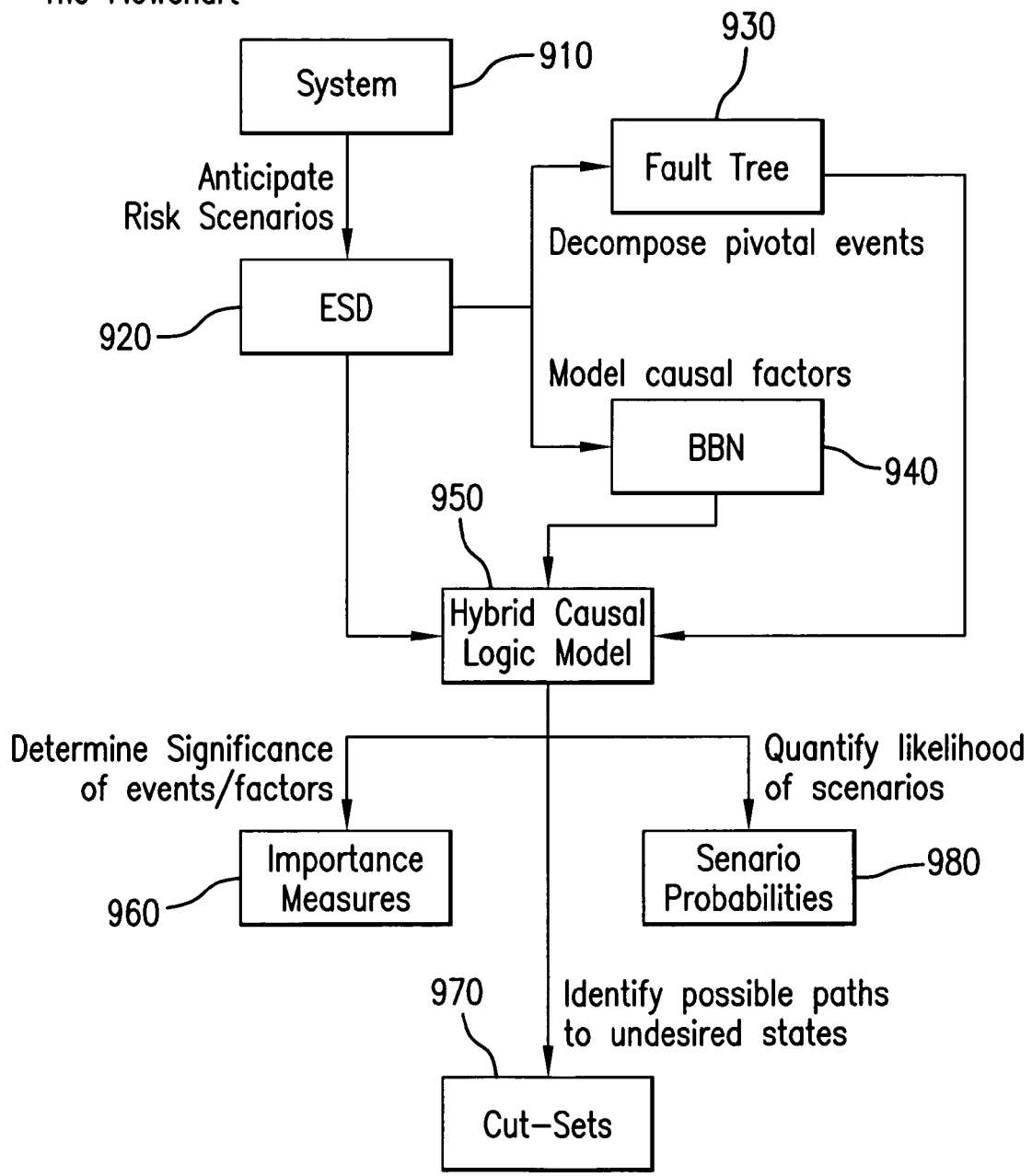
FIG. 9 is a schematic block diagram of an exemplary embodiment of the present invention; and, FIGS. 10A-10C are illustrations of views of an exemplary user interface in accordance with the present invention.

Referring now to FIG. 9, there is shown a functional block diagram of an exemplary embodiment of the present invention. From the system being modeled, illustrated at block 910, anticipated risk scenarios are formulated and are captured in an ESD 920. The pivotal events of the ESD 920 are decomposed to determine the conditions under which such pivotal event may occur. The conditions are captured in the fault tree 930. Additionally, causal factors are modeled in the BBN 940. The three component topologies, i.e., the ESD 920, the FT 930 and the BBN 940 may be manipulated through a user interface, as will be described below. This allows a user to enter data and arrange model configurations through topologies with which he is already familiar.

The ESD 920, the FT 930 and BBN 940 are incorporated into the hybrid causal logic (HCL) model 950 as described above. The HCL model quantifies its nodes, which correspond to the elements of its component topological representations, the ESD 920, the FT 930 and BBN 940. The probabilities computed by the HCL model may then be used to determine the significance of various events and/or causal factors through importance measures 960. Also, possible paths to undesired states may be identified through minimal cut-sets 970 identified via probabilities calculated by the HCL model. The likelihood of various risk scenarios are also identified through scenario probabilities 980.

Figure 10A:
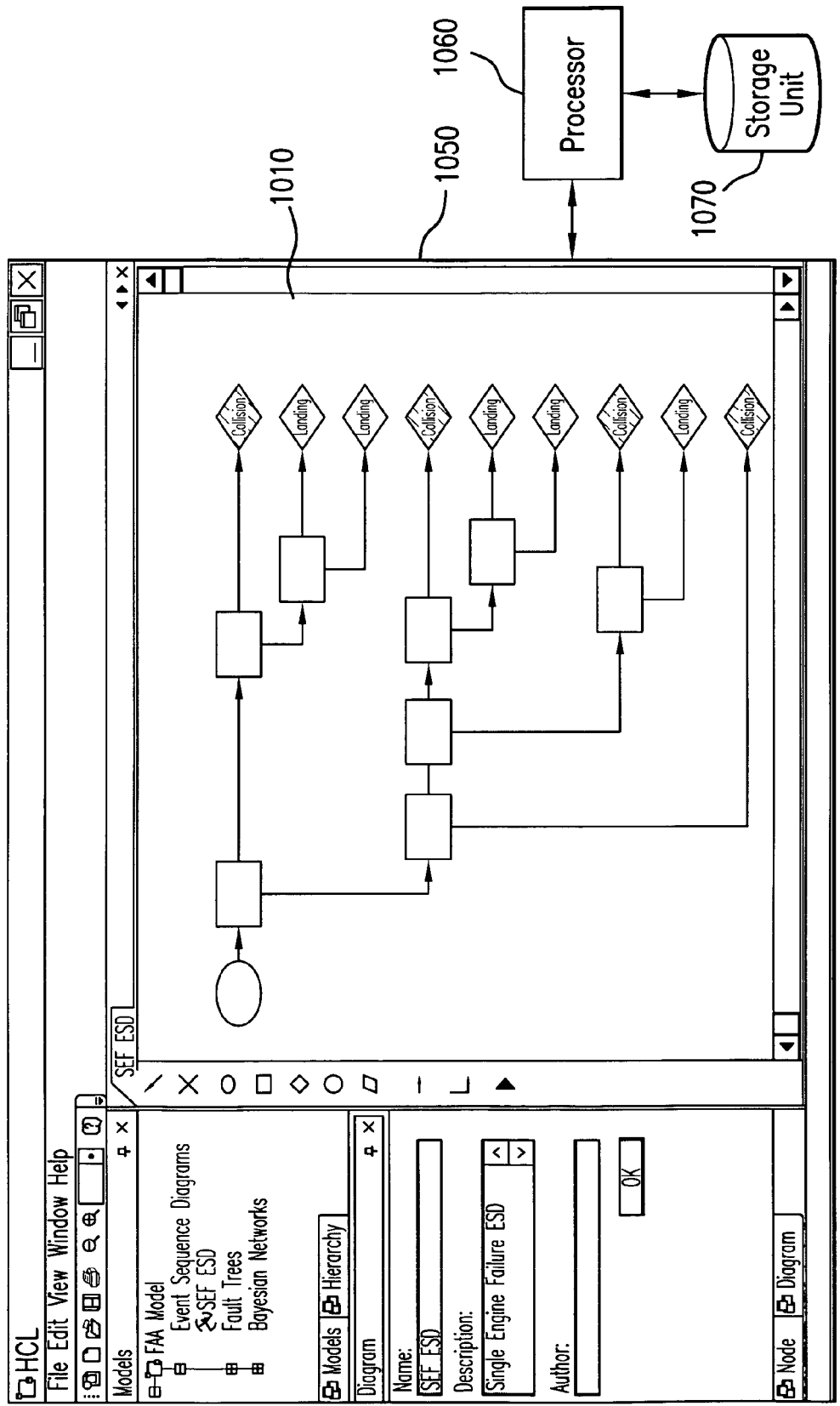
Figure 10B:
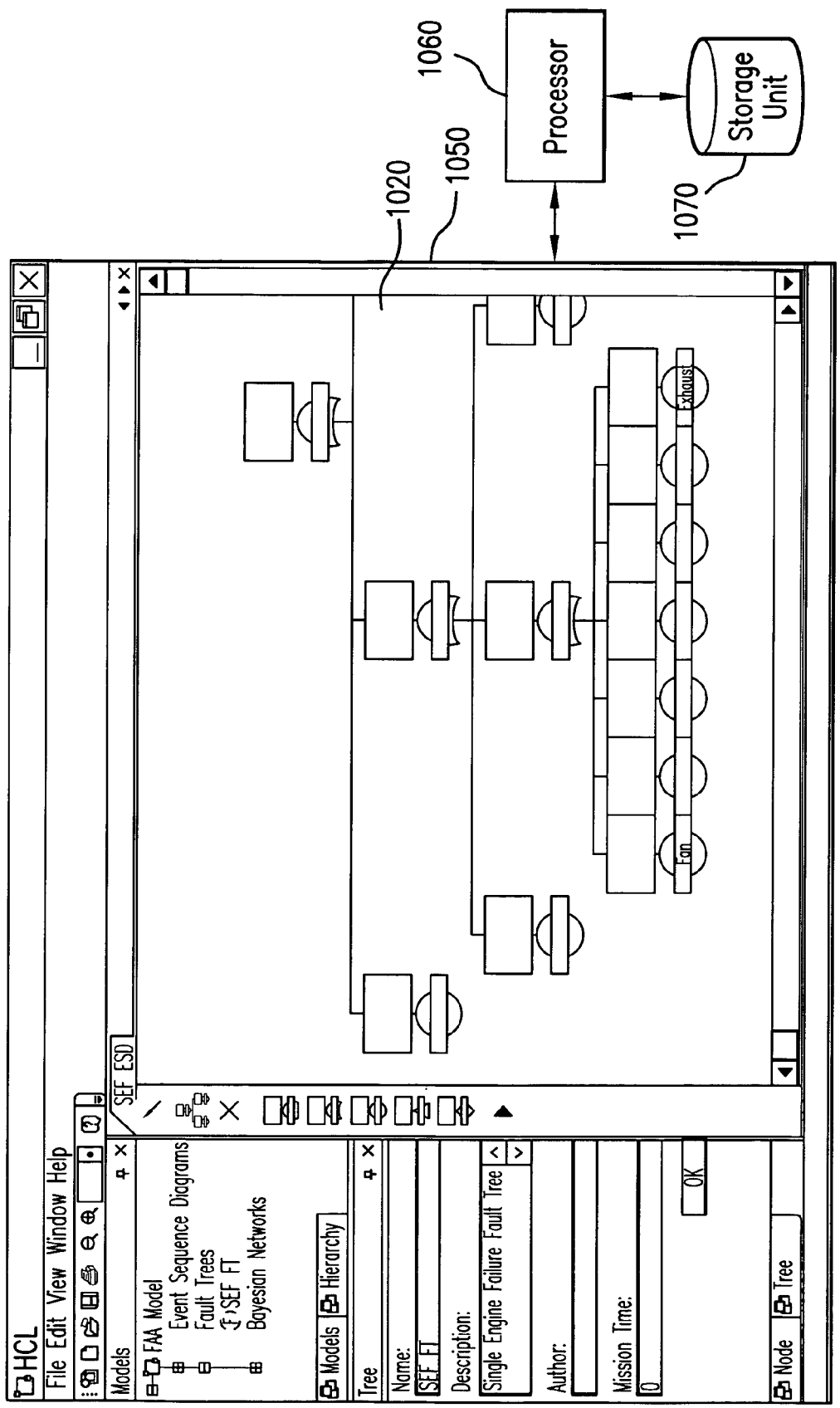
Figure 10C:
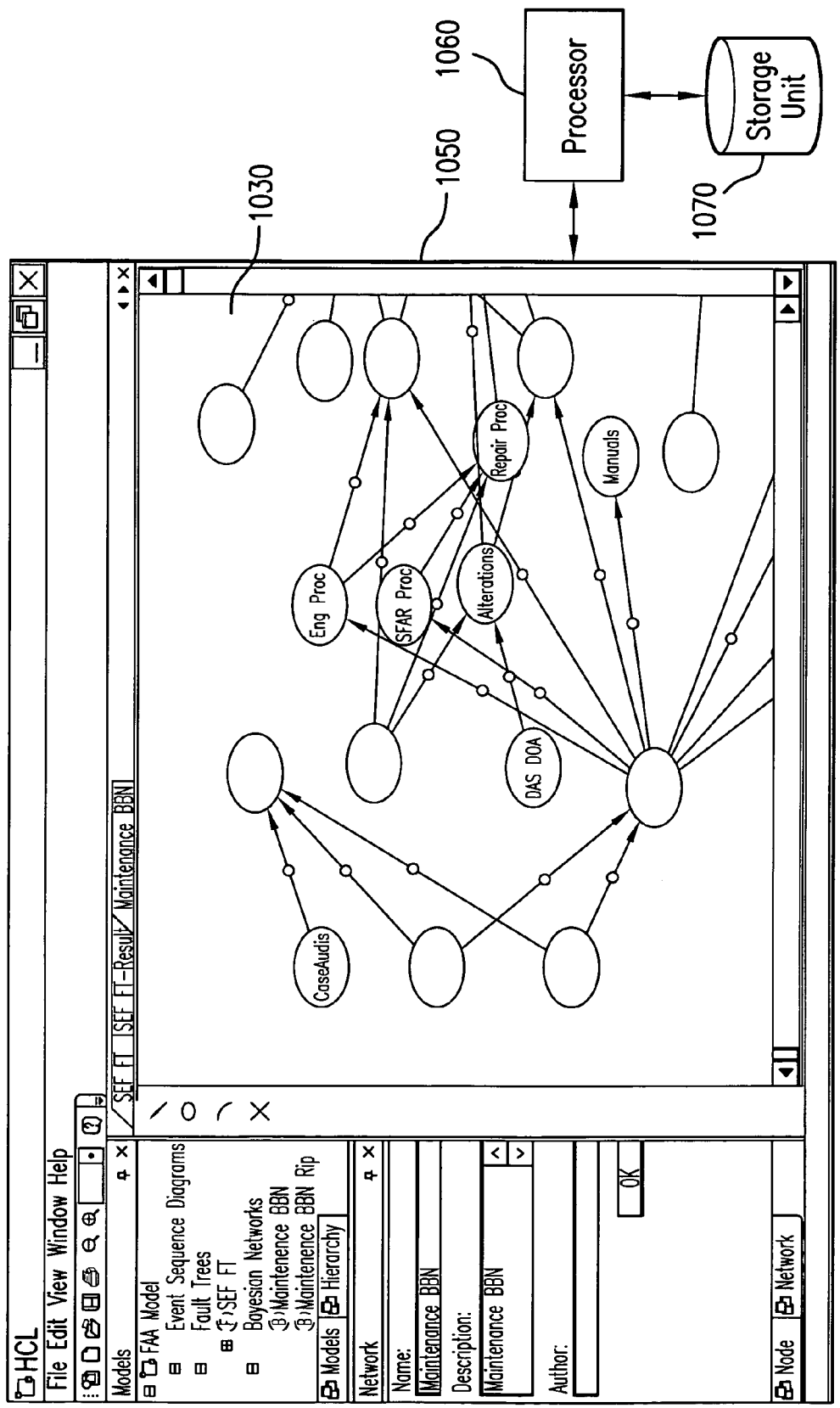

FIGS. 10A-10C illustrate views of an exemplary user interface for user data input and model manipulation in accordance with the present invention. FIG. 10A illustrates a view into a ESD editor 1010, where the initiating, pivotal and terminal events are identified, initialized and edited. The ESD editor 1010, as well as other model editors to be described below, is accessed through user interface 1050, which is coupled to a computational processor 1060. Computational processor 1060 executes processing instructions in a known manner to embody the invention described herein. Processor 1060 may be coupled to a storage unit 1070 for storing data and processing instructions. Alternatively, the processor 1060 may be embodied as discrete elements, as is well known in the art.

FIG. 10B illustrates an exemplary FT editor 1020, where the combinatorial logic of the fault trees may be edited and FIG. 10C illustrates an exemplary BBN editor, where the nodes and edges of the BBN may be initialized and reconfigured in accordance with a particular system, process or scenario. The user interface of FIGS. 10A-10C may be implemented in accordance with graphic user interface practices known in the art.

The descriptions above are intended to illustrate possible implementations of the present invention and are not restrictive. Many variations, modifications and alternatives will become apparent to the skilled artisan upon review of this disclosure. For example, components equivalent to those shown and described may be substituted therefor, elements and methods individually described may be combined and elements described as discrete may be distributed across many components. The scope of the invention should therefore be determined not with reference to the description above, but with reference to the appended claims, along with their full range of equivalents.

What is claimed is:

1. A method for determining via a computing processor a probability associated with a causal scenario including an initiating event, at least one pivotal event and an end state, the method comprising:

modeling the causal scenario by a first causal model characterized by a plurality of first nodes interconnected one with another to define a termination of the causal scenario in the end state via a Boolean state of at least one variable associated with said plurality of first nodes;

modeling factors affecting said Boolean state of said at least one variable at a corresponding one of said first nodes of said first causal model by a second causal model characterized by a plurality of second nodes, each of said second nodes representing a corresponding multistate variable indicative of an attribute of said factors, said plurality of second nodes being interconnected one with another in accordance with a joint probability distribution of said multistate variables, wherein said joint probability distribution is defined by a probabilistic network coupled to said second causal model for characterizing said factors, and wherein said second causal model includes at least one node corresponding to said at least one variable, said probabilistic network directly providing to at least one of said plurality of first nodes at least one second factor associated with said at least one pivotal event;

constructing from said first causal model and said second causal model a hybrid computational model executable on the processor; and executing said hybrid computational model on the processor to determine a probability of said at least one pivotal event of the causal scenario from a probability of said Boolean state of said at least one variable of said first causal model as determined from a probability of said factors affecting said Boolean state of said at least one variable calculated by said second causal model in accordance with said joint probability distribution of said multistate variables defined by said probabilistic network.

2. The method for determining a probability associated with a causal scenario as recited in claim 1 where said hybrid computational model execution step includes the step of determining a conditional probability of said at least one variable being in a predetermined state given a set of states of said multistate variables.

3. The method for determining a probability associated with a causal scenario as recited in claim 2, where said hybrid computational model execution step includes the step of determining at each of said first nodes a conditional probability given a logical conjunction of states of said at least one variable.

4. The method for determining a probability associated with a causal scenario as recited in claim 3, where said first node conditional probability determining step includes the steps of:

providing in a data store accessible to the computational processor a table for storing said conditional probabilities at said first nodes;

storing in said table said conditional probability for a first node and a set of states if such is not entered therein; and retrieving a previously determined probability from said table in lieu of said determination thereof if an entry in said table exists for said first node and said set of states.

5. The method for determining a probability associated with a causal scenario as recited in claim 3, where said conditional probability of said event determination step includes the steps of:

determining if said first node at which said conditional probability is determined is independent of said states of said at least one variable; and determining a marginal probability at said first node.

6. The method for determining a probability associated with a causal scenario as recited in claim 3, where said hybrid computational model constructing step includes the step of ordering in said first causal model said first nodes so that at least one node corresponding to said at least one variable is independent from another one of said at least one variable.

7. The method for determining a probability associated with a causal scenario as recited in claim 6, where said first node conditional probability determining step includes the steps of:

filtering said states of said at least one variable to include only states upon which said variable corresponding to said first node is dependent; and determining said conditional probability at said first node using said filtered states.

8. The method for determining a probability associated with a causal scenario as recited in claim 1 further including the steps of:

providing a user interface to the computational processor;

manipulating first graphical elements via said user interface to construct a first representation of said first causal model;

executing on the processor a procedure to transform said first representation of said first causal model into a second representation thereof, said second representation of said first causal model characterized by said plurality of first nodes; and constructing said hybrid computational model from said second causal model and said second representation of said first causal model.

9. A method for analyzing risk associated with a causal scenario comprising the steps of:

manipulating via a user interface first graphical elements to model the causal scenario by a first causal model defined by sequential logic, said first causal model determining an occurrence or nonoccurrence of at least one pivotal event in the causal scenario in accordance with states of a plurality of first variables respectively associated with said first graphical elements;

manipulating via said user interface second graphical elements to model factors associated with said at least one pivotal event by a second causal model defined by fault logic, said second causal model computing a probability of states of a plurality of second variables in accordance with a joint probability distribution of said plurality of second variables, each of said second variables respectively associated with said second graphical elements, said first causal model and said second causal model having at least one variable common therebetween;

executing on a computational processor a first procedure to transform said first causal model into a nodal graph representation thereof, said nodal graph representation of said first causal model characterized by a plurality of first nodes respectively associated with said plurality of first variables;

constructing a computational model from said second causal model and said nodal graph representation of said first causal model;

computing on said computational processor a probability of a state of said at least one variable common between said first and second causal models in accordance with said joint probability distribution, wherein said joint probability distribution is determined by a probabilistic network coupled to said second causal model to characterize said factors, said probabilistic network directly providing at least one second factor associated with said at least one pivotal event to said first causal model; and computing on said computational processor a probability of said event in accordance with said probability of said state of said at least one variable common between said first and second causal models.

10. The method for analyzing risk associated with a causal scenario as recited in claim 9 further including the steps of:

executing on said computational processor a second procedure to transform said second causal model into a second nodal graph representation thereof, said second nodal graph representation of said second causal model characterized by a plurality of second nodes respectively associated with said plurality of second variables, said second nodes interconnected one with another in accordance with said joint probability distribution of said second variables; and constructing said computational model from said second nodal graph representation of said second causal model and said nodal graph representation of said first causal model.

11. The method for analyzing risk associated with a causal scenario as recited in claim 10, where said computational model execution step includes the step of determining at each of said first nodes a conditional probability given a logical conjunction of states of said at least one variable common between said first and second causal models.

12. The method for analyzing risk associated with a causal scenario as recited in claim 11 further including the step of ordering said first nodes so that a first node corresponding to said at least one common variable is independent from another first node corresponding to another said at least one variable common between said first and second causal models.

13. The method for analyzing risk associated with a causal scenario as recited in claim 12, where said first node conditional probability determining step includes the steps of:
  filtering said states of said at least one variable common between said first and second causal models to include exclusively states upon which said variable corresponding to said first node is dependent; and
  determining said conditional probability at said first node using said filtered states.

14. An apparatus for evaluating risk in a system, comprising:
  a computational processor including a sequential logic unit characterizing anticipated risk scenarios of the system, said sequential logic unit including a plurality of decision units each corresponding to a pivotal event in said risk scenario, each of said decision units having an occurrence state or a nonoccurrence state of said pivotal event in accordance with a corresponding condition provided thereto;
  a fault logic unit associated with said computational processor and coupled to said sequential logic unit for providing said condition to each of said decision units, said fault logic unit including a plurality of combinatorial elements for determining each said condition from a corresponding set of causal factors;
  a probabilistic network unit associated with said computational processor and coupled to said fault logic unit for characterizing said causal factors of said system, said probabilistic network unit including a plurality of nodes interconnected one with another to define a joint probability distribution between variables representing said causal factors, said probabilistic network unit directly determining at least one of said conditions and being coupled to said sequential logic unit to provide said at least one condition thereto; and
  a hybrid causal model associated with said computational processor and determining a probability of said risk scenarios from a probability of each said pivotal event of said sequential logic as determined from a probability of each said corresponding condition provided thereto by said fault logic unit as determined from said joint probability distribution between said variables representing said corresponding causal factors of said probabilistic network unit.

15. The apparatus for evaluating risk factors associated with a system as recited in claim 14, wherein said probabilistic network unit determines directly at least one of said conditions and is coupled to said sequential logic unit so as to provide said at least one condition thereto.

16. The apparatus for evaluating risk factors associated with a system as recited in claim 14, wherein said hybrid causal model is characterized by a plurality of nodes arranged in a topological hierarchy corresponding to interconnections of said combinatorial logic and said probabilistic network unit, each of said nodes corresponding to a Boolean variable of said combinatorial logic or a variable of said probabilistic network unit.

17. The apparatus for evaluating risk factors associated with a system as recited in claim 14, wherein said sequential logic unit is an event sequence diagram.

18. The apparatus for evaluating risk factors associated with a system as recited in claim 14, wherein said fault logic unit is a fault tree.

19. The apparatus for evaluating risk factors associated with a system as recited in claim 14, wherein said probabilistic network unit is a Bayesian belief network.

* * * * *